Nov. 20, 1928. 1,692,316

E. W. SMITH

STORAGE BATTERY

Filed Dec. 31, 1927

WITNESS:

INVENTOR

Edward W. Smith
BY
Augustus B. Stoughton.
ATTORNEY.

Patented Nov. 20, 1928.

1,692,316

UNITED STATES PATENT OFFICE.

EDWARD W. SMITH, OF PHILADELPHIA, PENNSYLVANIA.

STORAGE BATTERY.

Application filed December 31, 1927. Serial No. 243,887.

The principal object of the present invention is to improve, cheapen and simplify the construction and arrangement of that type of storage battery in which the intercell connectors are contained within the interior and in which a single cover encloses more than one cell.

Other objects of the invention will appear from the following description at the end of which the invention will be claimed.

Figure 1:
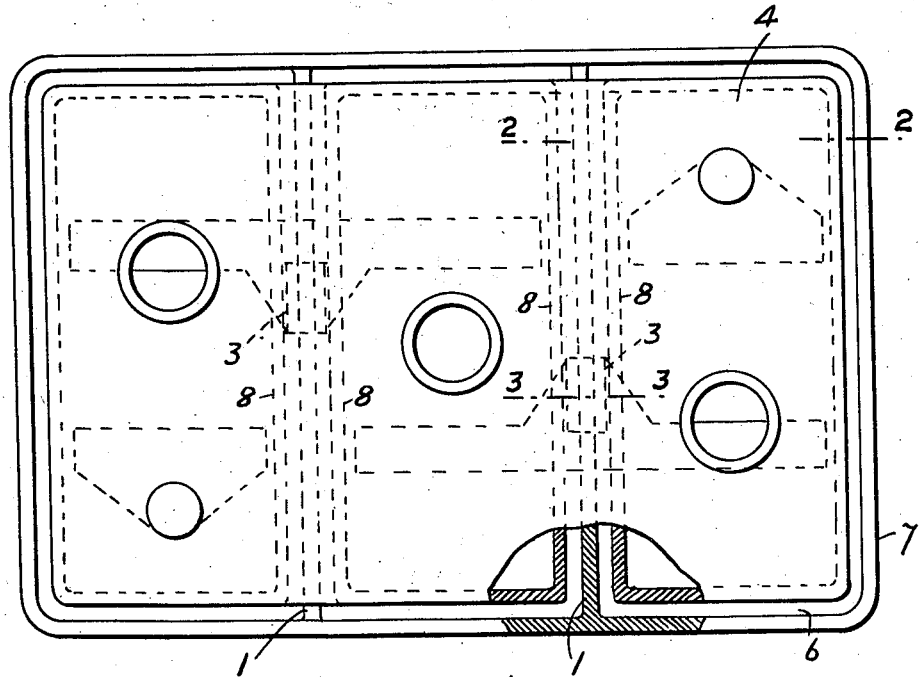

In the following description reference will be made to the accompanying drawing forming part hereof and in which Figure 1 is a top or plan view with parts broken away and in section of a storage battery embodying features of the invention.

Figure 2:
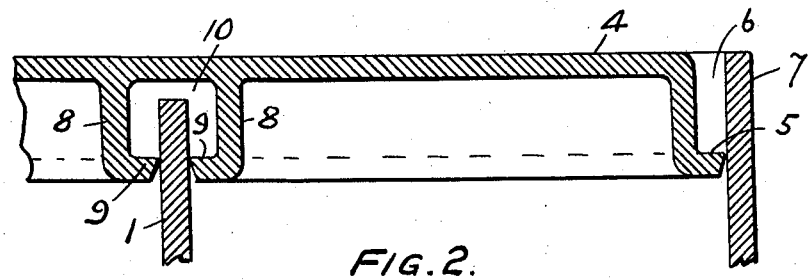
Figure 3:
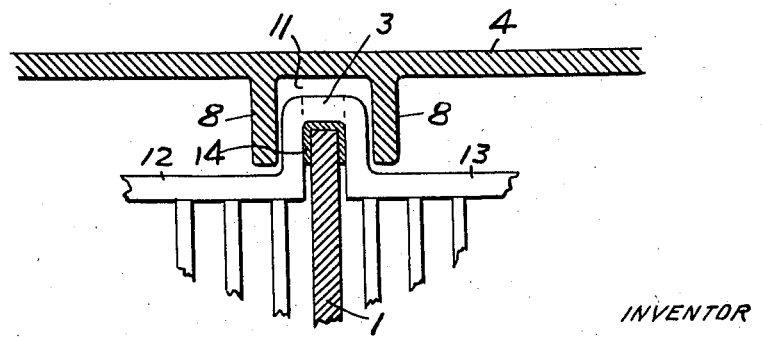

Fig. 2 is a view drawn to an enlarged scale and it is a vertical section on the line 2—2 of Fig. 1, and Fig. 3 is a similar view taken on the line 3—3 of Fig. 1.

Referring to the drawing, the vertical intercell walls are shown at 1. Intercell connectors provided with yokes 3 span the cell walls at their upper portions. A single piece cover 4 is common to the several cells and is adapted to fit into the container. The cover is provided with an external or outwardly extending marginal flange 5, which provides space, generally indicated at 6, for sealing compound between the cover and the outer wall of the container 7. The cover is concave and the face of the concavity is provided with spaced ribs 8, adapted to receive between them the yoke 3 of the connector, shown in Figure 3, as well as the intercell partition wall 1, as shown in Fig. 2. Ribs 8, as shown in Fig. 2, aside from the space occupied by the yoke 3, are provided with confronting ledges 9, fitting close to the cell wall 1 and the ledges are aligned with the external flange 5 to provide space, generally indicated at 10, for sealing compound, as shown in Fig. 2. The space 10 in Fig. 2 is continuous with the space generally indicated at 11 in Fig. 3 and with this space around the yoke 3, and between it and the ribs 8; also with the space 6 around the outside and the cover. There is thus provided a continuous seal around the top of each of the cells and extending over the intercell partition wall and connector.

As shown in Fig. 3, the ribs 8 are not provided with the confronting ledges 9, but are spaced adjacent to the intercell partition wall 1, so that there is still a continuous sealing space over the top of the intercell partition wall and the connector, as before. Plate structures are shown at 12 and 13, and they are not claimed herein, nor is the element at 14, as they are the subject of my application for Letters Patent S. No. 243,888.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. A storage battery container having vertical intercell partition walls and intercell connectors provided with yokes mounted at the top portions of said walls, and an externally flanged concave cover common to several cells and adapted to fit into said container, the concave face of said cover being provided with spaced ribs adapted to receive between them the yoke of a connector and the top part of said cell wall, and said ribs on opposite sides of the yoke provided with confronting ledges.

2. A storage battery container having vertical intercell partition walls and intercell connectors provided with yokes mounted at the top portions of said walls, and an externally flanged concave cover common to several cells and adapted to fit into said container, the concave face of said cover being provided with spaced ribs adapted to receive between them the yoke of a connector and the top part of a cell partition wall.

EDWARD W. SMITH.